(12) United States Patent
Fujimaki et al.

(10) Patent No.: US 7,551,398 B2
(45) Date of Patent: Jun. 23, 2009

(54) MAGNETIC HEAD WITH AIR BEARING SURFACE PROTECTION FILM AND MANUFACTURING METHOD THEREOF

(75) Inventors: Shigehiko Fujimaki, Tokyo (JP); Hiroshi Inaba, Yokohama (JP); Hiroshi Ishizaki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 375 days.

(21) Appl. No.: 11/245,481

(22) Filed: Oct. 5, 2005

(65) Prior Publication Data

US 2006/0072246 A1 Apr. 6, 2006

(30) Foreign Application Priority Data

Oct. 5, 2004 (JP) ............................. 2004-292133

(51) Int. Cl.
*G11B 5/60* (2006.01)
(52) U.S. Cl. .................................... 360/235.4
(58) Field of Classification Search ............. 360/235.1, 360/235.2, 235.4; 427/248.1, 127
See application file for complete search history.

(56) References Cited

U.S. PATENT DOCUMENTS

| 5,159,508 | A | | 10/1992 | Grill et al. | |
| 5,674,638 | A | * | 10/1997 | Grill et al. | 428/835.2 |
| 6,396,664 | B2 | * | 5/2002 | Koishi et al. | 360/235.8 |
| 6,433,965 | B1 | * | 8/2002 | Gopinathan et al. | 360/235.4 |
| 6,624,977 | B1 | * | 9/2003 | Boutaghou | 360/235.2 |
| 6,878,404 | B2 | * | 4/2005 | Veerasamy et al. | 427/249.7 |
| 7,130,154 | B2 | * | 10/2006 | Otsuka et al. | 360/237 |
| 7,175,926 | B2 | * | 2/2007 | Ma et al. | 428/833.3 |
| 2002/0028289 | A1 | * | 3/2002 | Veerasamy | 427/249.7 |
| 2007/0058297 | A1 | * | 3/2007 | Kasamatsu et al. | 360/235.1 |

FOREIGN PATENT DOCUMENTS

JP 10-003630 1/1998

* cited by examiner

*Primary Examiner*—Angel A. Castro
(74) *Attorney, Agent, or Firm*—Townsend and Townsend and Crew LLP; Rambod Nader

(57) ABSTRACT

To promote reduction in thickness of an air bearing surface protective film of a magnetic head, a magnetic head having an air bearing surface protective film consisting only of a thin carbon film while excluding formation of a dead layer by ion incidence as less as possible to the read/write device, and a manufacturing method therefore, are provided. In an embodiment, an air bearing surface protective film of a magnetic head comprises a thin carbon film, in which the mass density a lowermost layer of the air bearing surface protective film on the side of a magnetic device is made lower compared with a thin carbon film constituting other adjacent layers. Further, the manufacturing method comprises deposition under the control of time for the incident angle of ion flow to a substrate to be processed and deposition under the control of time for the ion flow energy to a substrate to be processed.

10 Claims, 12 Drawing Sheets

Fig. 4
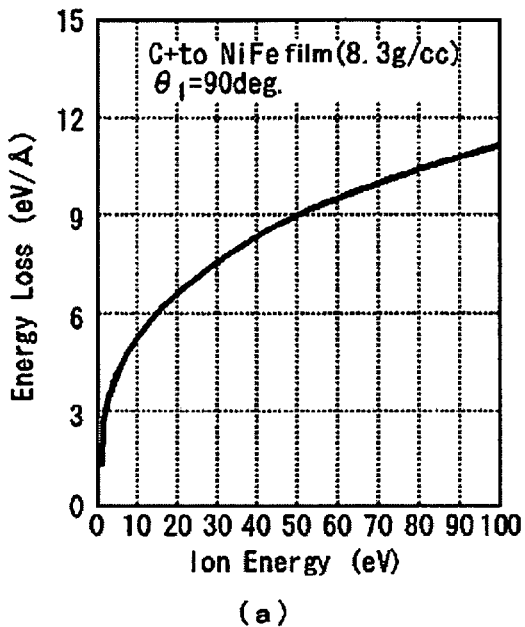
(a)
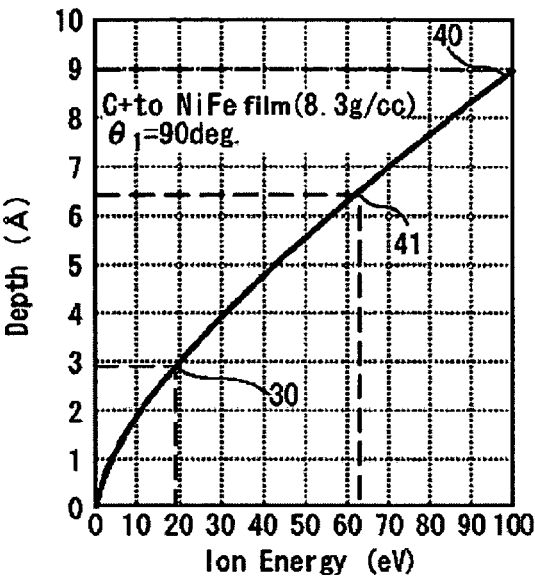
(b)
Fig. 5
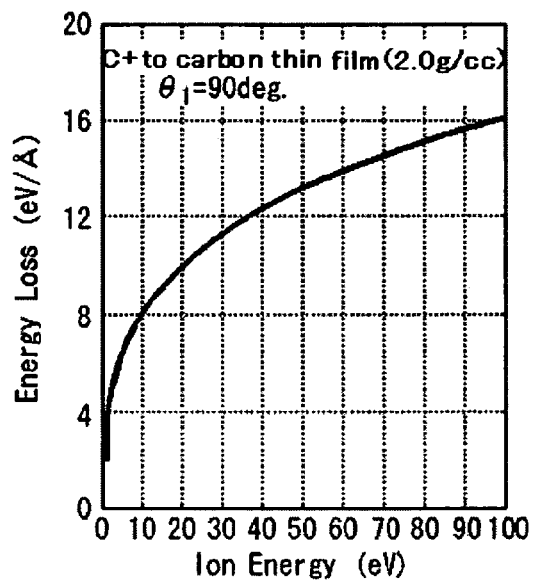
(a)
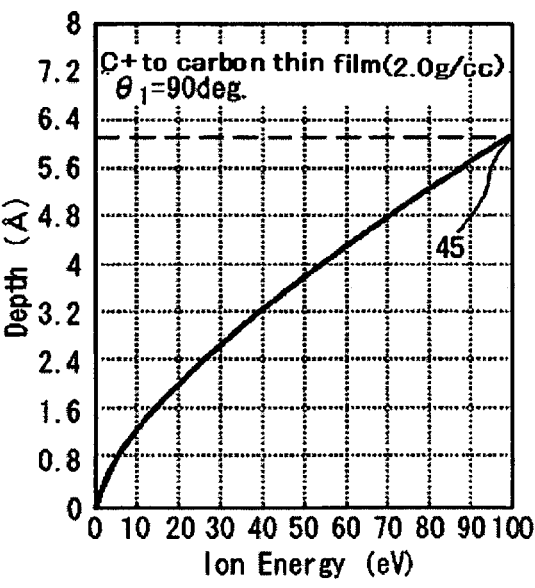
(b)

Fig. 14
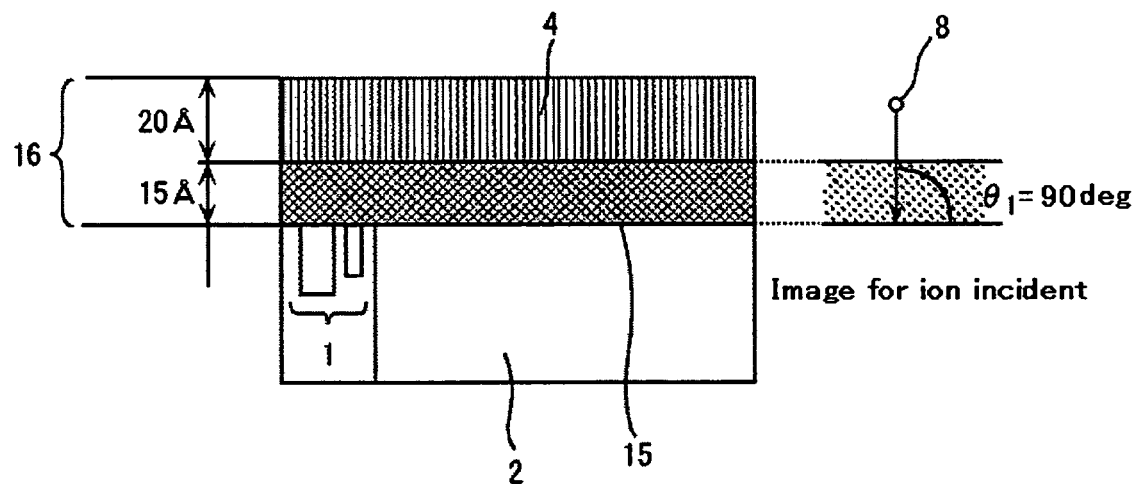
Fig. 15
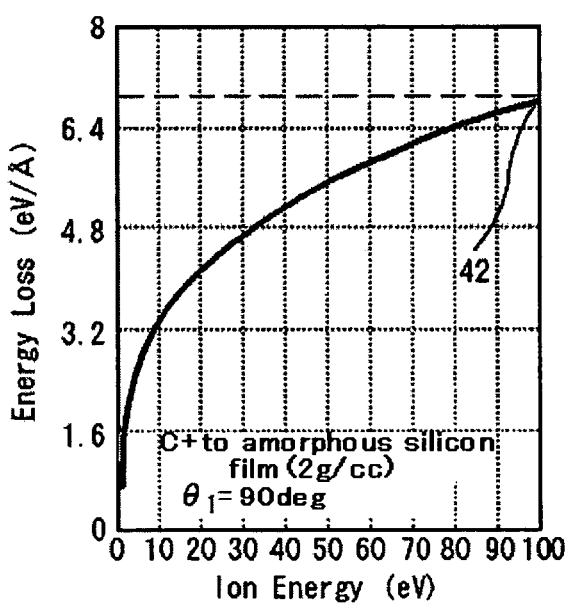
(a)
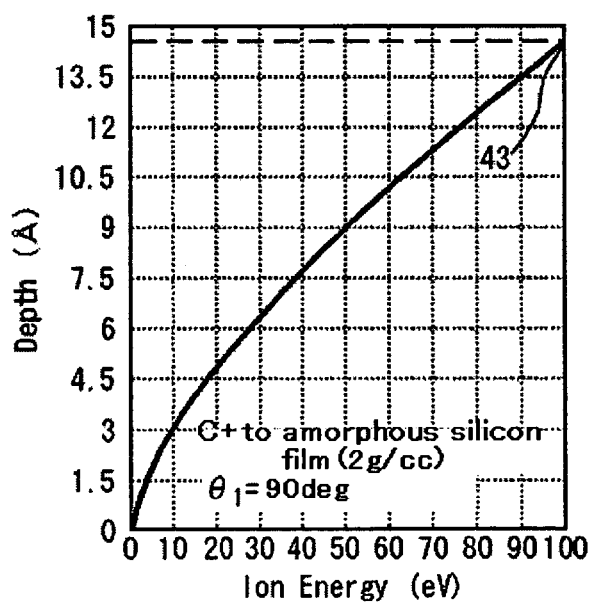
(b)

MAGNETIC HEAD WITH AIR BEARING SURFACE PROTECTION FILM AND MANUFACTURING METHOD THEREOF

CROSS-REFERENCES TO RELATED APPLICATIONS

This application claims priority from Japanese Patent Application No. JP2004-292133, filed Oct. 5, 2004, the entire disclosure of which is incorporated herein by reference.

BACKGROUND OF THE INVENTION

The present invention relates to a magnetic head having both a read element having a magnetic sensor film of a giant magnetoresistive (hereinafter referred to as GMR) type or tunneling magnetoresistive (hereinafter referred to as TMR) type, and a write element using induction magnetic fields generated by carrying electricity to coils, as well as a manufacturing method thereof.

The bearing surface protective film of a magnetic head known so far has a structure obtained by at first forming a thin silicon film by a physical vapor deposition (PVD) method or the like as a stress relaxation layer for improving adhesion with an alumina titanium carbide substrate, and then forming a thin hydrogenated carbon film on the thin silicon film also by way of a physical vapor phase deposition (PVD) method by a plasma process, or by a chemical vapor deposition method as described in Japanese Patent Laid-open No. 4-364217 (Patent Document 1). Further, Japanese Patent Laid-open No. 10-3630 (Patent Document 2) discloses a magnetic head applying stress design to the portion of the hydrogenated thin carbon film in order to improve the sliding resistance and corrosion resistance.

BRIEF SUMMARY OF THE INVENTION

Since the thin silicon film is essential as an adhesion layer in any of the conventional technology examples (Patent Documents 1, 2) described above, it hinders reduction of thickness of the magnetic head air bearing surface protective film. Further, while the use of the thin hydrogenated carbon film is described in both the examples, adding an appropriate amount of hydrogen provides the trade-off relation in which the bonding ratio by a tetrahedral structure ($SP^3$) in the thin film increases, whereas a structural defect in the thin film due to hydrogen atoms occurs (separation of bonding). Thus, the sliding resistance and the corrosion resistance exceeding a certain level of effect cannot be expected.

A feature of the present invention is to provide, for promoting the reduction of thickness of a protective film included in a magnetic head air bearing surface, a constitution of a bearing surface protective film of: ensuring adhesion without using a thin silicon film, removing structural defects attributable to hydrogen by a thin carbon film not containing hydrogen, and ensuring a high $SP^3$ bonding ratio by a carbon thin film not containing hydrogen, as well as a manufacturing method thereof. The $SP^3$ bonding ratio means the ratio of $SP^3$ bonding in 100% total for the bonding state (tetrahedral structure ($SP^3$), trigonal structure ($SP^2$), and linear structure (SP)) of all atoms forming the thin film carbon atoms.

In the growing process of a thin carbon film, the difference of energy of vapor deposition particles depending on the vapor deposition system is reflected on the film property. For example, the average energy of sputtering particles in a PVD method is about 5 eV while the reaction gas species (radicals) have further lower thermal kinetic energy of about 0.03 eV in a CVD method. When a negative bias is applied to an electrode for holding a substrate to be processed, reaction gas ions (hydrocarbon ions) are accelerated by several hundreds volt which is reflected on the physical property. Generally, no dense tetrahedral amorphous carbon structure is grown in the surface deposition of low energy vapor deposition particles under a low pressure and, particularly, hydrocarbon radicals are polymerized in the surface deposition of them. On the contrary, when carbon ions are incident under acceleration, they intrude inside the film, undergo large internal pressure and grow dense tetrahedral structure ($SP^3$) with less free energy loss. However, upon excess ion incident energy, they are transformed into heat to grow a thermally stable graphite-like trigonal structure ($SP^2$).

On the other hand, in a cathodic arc vapor deposition method using an arc plasma source as an ion source, only the carbon ions at an energy of 50 to 100 eV can be drawn by using a graphite cathode, which is suitable to the formation of a dense thin carbon film (tetrahedral amorphous carbon). The tetrahedral amorphous carbon formed by the cathodic arc vapor deposition method consists only of carbon atoms in which the $SP^3$ bonding ratio of carbon valance electrons reaches a high level and the mass density is as high as 2.5 g·cm$^{-3}$ or more. While a high-density hydrogenated carbon film can be formed also by the plasma CVD method when ion energy controlled by using electron cyclotron resonance with acetylene as a reaction gas, the mass density only increases up to 2.4 g·cm$^{-3}$. The mass density of tetrahedral-amorphous carbon by the cathodic arc vapor deposition method is described specifically by Ferrari et al. in Density, $SP^3$ fraction, and cross-sectional structure of amorphous carbon films determined by X-ray reflectivity and electron energy-loss spectroscopy, in Physical Review B, 62, (2000) pp. 11080 to 11103.

In the cathodic arc vapor deposition, the energy Ei of carbon ions incident on a substrate to be processed is represented by equation (1) assuming elementary electric charge, plasma potential, bias for a substrate to be processed, and initial ion energy as e, Vp, Vb, and Eo, respectively. According to our experiment, carbon ions are incident at an energy of 50 to 100 eV, in a state where Eo=25 eV and Vp=25 to 75 V, and the bias Eo is not applied to the substrate to be processed.

$$Ei = e(Vp - Vb) + Eo \qquad (1)$$

The relationship between the energy Ei of the incident carbon ions and the incident depth to the thin film on the substrate to be processed is described, for example, also by Morita et al., Analytical Calculation of Energy Spectra of keV Light Particles Reflected from Solid Surfaces, in JAPANESE JOURNAL OF APPLIED PHYSICS VOL. 22, No. 7 (1983) pp. 1112-1118, and this will be described briefly.

Calculation can be done by using a model in which carbon ions incident on the thin film on the substrate to be processed give energy to atoms constituting the solid (thin film) in the deceleration process. That is, assuming a shield coulomb potential in the deceleration process as Thomas-Fermi potential, the stopping power of ions incident on carbon (average energy applied from the incident ions to the thin carbon film) and the incident depth are as shown below.

$$\frac{dE}{dx} - N\sigma_n = 4\pi\alpha N Z_1 Z_2 C_0 e^2 \frac{M_1}{M_1 + M_2} S(\varepsilon) \ (J/m) \qquad (2)$$

$\sigma_n$: nuclear collision cross sectional area, $$a = \frac{0.885 a_0}{(Z_1^{1/2} + Z_2^{1/2})^{2/3}};$$

Thomas-Fermi radius, $$C_0 = \frac{1}{4\pi\varepsilon_0},$$

$$S(\varepsilon) = \frac{d\varepsilon}{d\gamma};$$

non-dimensional stopping power (ε conversion energy), $$N = \frac{N_a \rho}{M}$$

M1, M2: masses of atomic product density incident particles and target particles, Z1, Z2: atom numbers of incident particles and target particles.

According to equation (2), when carbon ions enter at an energy of 100 eV to a tetrahedral-amorphous carbon thin film with a mass density of 2.5 g•cm$^{-3}$, they enter by about 5.0 Å corresponding to about three atom layers. However, in a case of a thin silicon film with a mass density of about 2.0 g•cm$^{-3}$, since they are incident on Si metal atoms with a larger amount of mass, energy exchange is less and they enter to about 15 Å to form a mixed region for the thickness.

On the other hand, the thin silicon film formed by direct vapor deposition to the read/write elements of a magnetic head has an incident energy of about 5 eV as described above and intrusion to the thin film constituting the read/write elements is negligible (for example, 0.4 Å to NiFe thin film (each 50 wt %)) and has no defect of deteriorating the read/write characteristics. As has been described above, in a case of forming the thin carbon film by the cathodic arc vapor deposition method (at a carbon ion energy of 50 to 100 eV), a thin silicon film having a function of improving the adhesion as a stress relaxation layer and preventing the deterioration of the read/write characteristics is necessary by about 15 Å or more. This results in a significant hindrance to the reduction of the protective film thickness of the magnetic head necessary for reducing the magnetic spacing which is important for the improvement of the magnetic recording density as a magnetic disk apparatus.

In view of the above, for making the reduction of the film thickness and the adhesion of the bearing surface protective film compatible, the reduction of the film thickness and the enhanced adhesion are attained in the invention by not using a thin silicon film with an internal compressive stress of about 0 to −2 GPa which was used in the conventional technology for improving the adhesion. The air bearing surface protective film of the magnetic head for attaining the purpose has a feature in that the air bearing surface protective film comprises a thin carbon film which has a multi-layered structure of different mass densities, or a structure with the mass density being changed in the direction of the depth, and in that the mass density of the thin carbon film constituting the surface of the bearing surface protective film in contact with the magnetic device is made lowest in any of the cases, and at least the uppermost surface of the air bearing surface protective film is constituted with tetrahedral-amorphous carbon with increased mass density. Specifically, in the step of forming the carbon film on the side of the uppermost surface of the air bearing surface protective film, since tetrahedral-amorphous carbon with a mass density of 2.5 to 3.5 g•cm$^{-3}$ and an internal compressive stress of about −3 to −10 GPa is formed, it is formed by causing the ion flow to enter substantially vertically at a high incident angle approximate to the normal line relative to the air bearing surface of the magnetic head slider as a substrate to be processed. In a state where a bias Eo is not applied to the substrate to be processed, carbon ions are incident at an energy of 50 to 100 eV in equation (1). However, to obtain tetrahedral-amorphous carbon with a high mass density corresponding to the mass density of 3.4 g•cm$^{-3}$, it is necessary to consider the optimal condition within a range of the ion energy from 50 to 200 eV and some negative bias is applied to the substrate to be processed. However, application of a negative bias which provides an ion energy in excess of 200 eV decreases the SP$^3$ bonding ratio in the film, and results in graphite like film quality, and the incident depth of ions is increased, so that care has to be taken.

On the other hand, the thin carbon film constituting the surface in contact with the magnetic device as the feature of the invention is formed by vapor depositing an ion flow at a low incident angle approximate to the horizontal direction of the air bearing surface of the magnetic head slider as a substrate to be processed. This method applies an excess ion incident energy per unit film thickness and grows a thermally stable graphite-like trigonal structure (SP$^2$) to form a carbon film having a mass density lower than that of tetrahedral-amorphous carbon, internal compressive stress of about 0 to −2 GPa, and the low tetrahedral structure (SP$^3$) bonding ratios present in admixture (low mass density amorphous carbon). Since the low mass density amorphous carbon has an internal compressive stress about equal with that of the thin silicon film used usually as the adhesion film, it is effective in keeping the adhesion with the head material as an amorphous carbon stress relaxation layer.

Further, by vapor depositing the ion flow at a low incident angle approximate to a horizontal direction relative to the magnetic head slider as a substrate to be processed, the ion incident depth to the metal film, etc. constituting the magnetic head device can be made shallow and the mixing layer (dead layer) of the carbon ions and the metal film can be minimized. Controlling the incident angle of the ion flow includes a method of providing an inclining mechanism to an electrode for holding a substrate to be processed, as well as a method of controlling the ion flow itself by an ion flow control mechanism such as an electromagnet, opposed electrodes, etc.

In addition, there is also a method of attaining amorphous carbon with low mass density by decelerating incident ions. In this case, ions are incident at energy insufficient to form a tetrahedral structure (SP$^3$) per unit film thickness and a carbon film with the low SP$^3$ bonding ratio is formed in admixture, as a stress relaxation layer for improving the adhesion. Specifically, while the energy of the ion flow for forming the tetrahedral structure (SP$^3$) is from 50 to 200 eV in a case of incidence while being fixed substantially vertically relative to the substrate to be processed, the low mass density amorphous carbon obtained by this method is formed at the carbon ion energy of lower than 50 eV. This can lower the SP$^3$ bonding ratio and reduce the internal compressive stress to about 0 to −2 GPa and the incident depth of the ions to the metal film constituting the magnetic device can be made shallow. For example, amorphous carbon at a low mass density can be obtained with carbon ions at 20 eV, and the ion incident depth to the thin NiFe metal film constituting the magnetic device can be suppressed to about 3 Å. The deceleration means for the incident ions includes a method of controlling the ion incident depth to the vapor deposited thin film by adding a bias application mechanism to a substrate to be processed and a method of controlling the ion incident depth in the vapor deposited thin film by one or more grid electrodes disposed between the ion source and the film deposition chamber.

The tetrahedral-amorphous carbon constituting the uppermost surface (uppermost portion) of the air bearing surface protective film of the magnetic head manufactured by the method according to an embodiment of the invention as described above is a thin carbon film with a required minimum thickness for constituting the tetrahedral structure ($SP^3$) (lattice constant) of 3.5 Å or more and with a mass density of from about 2.5 to 3.4 g•cm$^3$. On the other hand, the amorphous carbon with low mass density in which the mass density of the thin carbon film constituting a surface (portion) of the bearing surface protective film in contact with the magnetic device is made lowest is a carbon film with a mass density of from about 1.5 to 2.4 g•cm$^{-3}$ and with the $SP^3$ bonding ratio of less than 50%, in which the required minimum thickness for constituting the trigonal structure is 2.5 Å or more. Further, since the total thickness of the bearing surface protective film of the magnetic head applied at current products is 50 Å, the effect of the invention with an aim of reducing the thickness of the magnetic head protective film can be recognized in the region with the total film thickness of less than 50 Å. Accordingly, to restrict the total film thickness of the tetrahedral-amorphous carbon and the low mass density amorphous carbon to less than 50 Å, a range should be restricted as about 3.5 Å or more and less than about 47.5 Å for the tetrahedral amorphous carbon and as about 2.5 Å or more and less than about 46.5 Å for the low mass density amorphous carbon.

According to the present invention, the thickness of the air bearing surface protective film of the magnetic head can be reduced. Specifically, film thickness is reduced by not using the thin silicon film as the adhesion layer while adhesion is maintained. Further, a magnetic head is provided which has an air bearing surface protective film only consisting of a thin carbon film while excluding formation of the dead layer to the read/write elements by carbon ion incidence as less as possible, as well as a manufacturing apparatus and a method therefor are provided.

BRIEF DESCRIPTION OF THE DRAWINGS

FIG. 4 includes diagrams showing the relationships between the carbon ion energy and the incident depth into a NiFe film, and between the carbon ion energy and energy loss upon deposition of carbon ions at vertical incidence on the magnetic material NiFe film based on the calculation for nuclear stopping power according to an embodiment of the invention.

FIG. 5 includes diagrams showing the relationships between the carbon ion energy and the incident depth to low mass density amorphous carbon, and between the carbon ion energy and energy loss upon deposition of carbon ions at vertical incidence on a thin carbon film with a mass density of 2.0 g•cm$^{-3}$ (low mass density amorphous carbon) based on the calculation for nuclear stopping power according an embodiment of to the invention.

FIG. 10 is a constitutional view of a thin film magnetic head manufacturing apparatus in which an ion source comprises a plasma arc source and a bend duct and a film deposition chamber to be introduced with the ion flow comprises a mechanism for inclining a substrate to be processed and a mechanism for applying bias to be substrate to be processed according to the invention and which is provided with ion flow incident angle control and ion flow energy control.

FIG. 11 shows a Fourier transformation magnitude profile up to 4 Å of a carbon atomic distance measured at an arbitrary depth of an air bearing surface protective film of a magnetic head analyzed by AES-EELFS (Extended Electron Energy Loss Fine Structure using Auger Electron Spectroscopy) analysis.

FIG. 12 shows ELNES (Electron Energy Loss Near Edge Structure) spectrum measured at an arbitrary depth of an air bearing surface protective film of a magnetic head by AES-EELFS (Extended Electron Energy Loss Fine Structure using Auger Electron Spectroscopy).

FIG. 13 is a graph showing the adhesion and sliding characteristics of an air bearing surface protective film of a magnetic head slider under different forming conditions according to an embodiment of the invention.

FIG. 14 is a schematic cross sectional view of a magnetic head slider in a case of forming tetrahedral-amorphous carbon to 20 Å on a thin silicon film of 15 Å thick according to the conventional technology example.

FIG. 15 is a diagram showing the relationships between carbon ion energy and incident depth and between carbon ion energy and energy loss upon vapor depositing carbon ions at vertical incidence to a thin silicon film as an adhesive layer based on calculation for nuclear stopping performance for the conventional technology example.

DETAILED DESCRIPTION OF THE INVENTION

Specific embodiments of the present invention will be described with reference to the drawings.

FIRST EMBODIMENT

Figure 1:
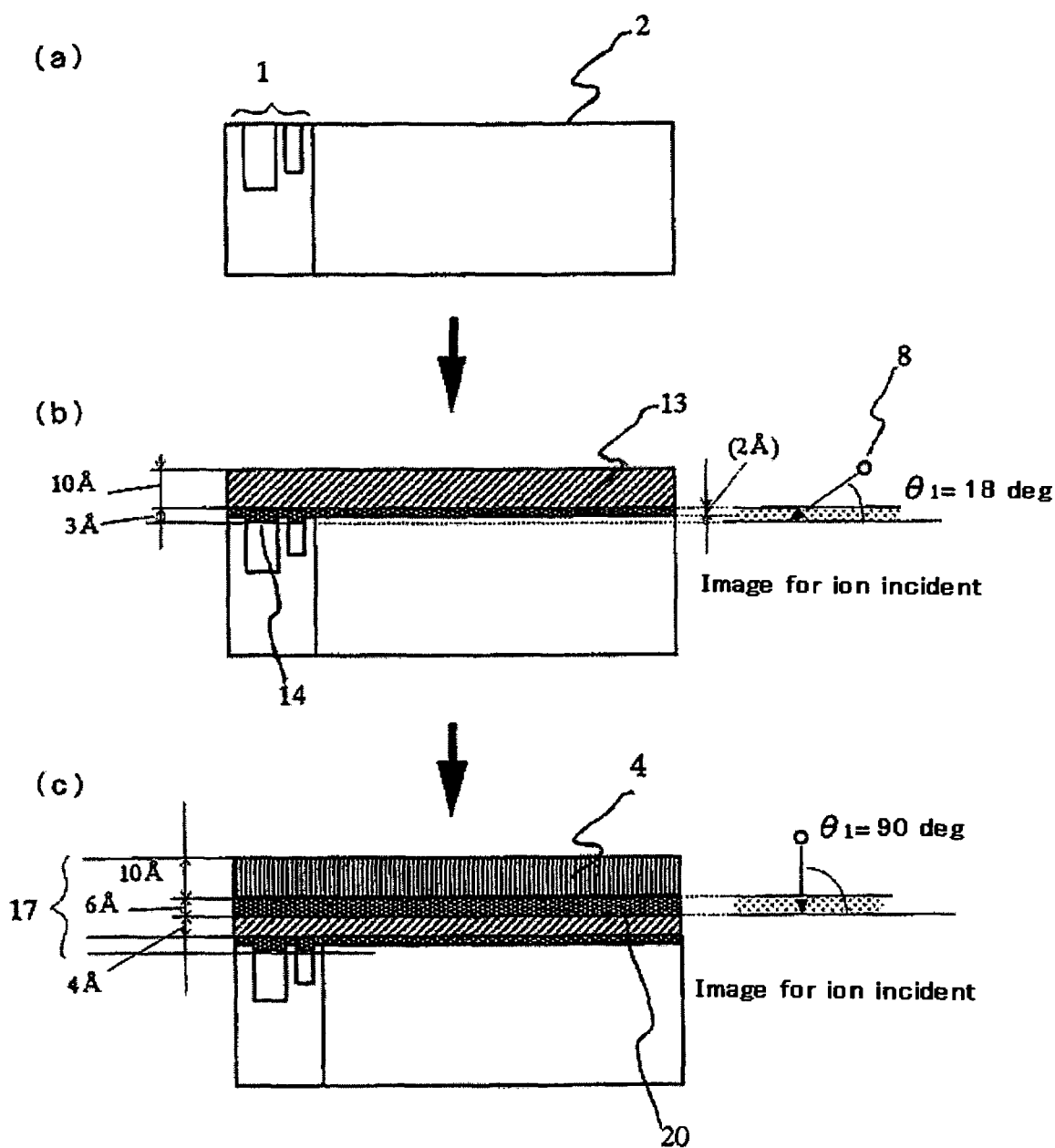
FIG. 1 includes an outlined process and schematic cross-sectional views of a magnetic head slider in a case of forming a low mass density amorphous carbon of 10 Å thick and then forming tetrahedral-amorphous carbon of 10 Å thick by the technique according to an embodiment of the present invention.
Figure 3:
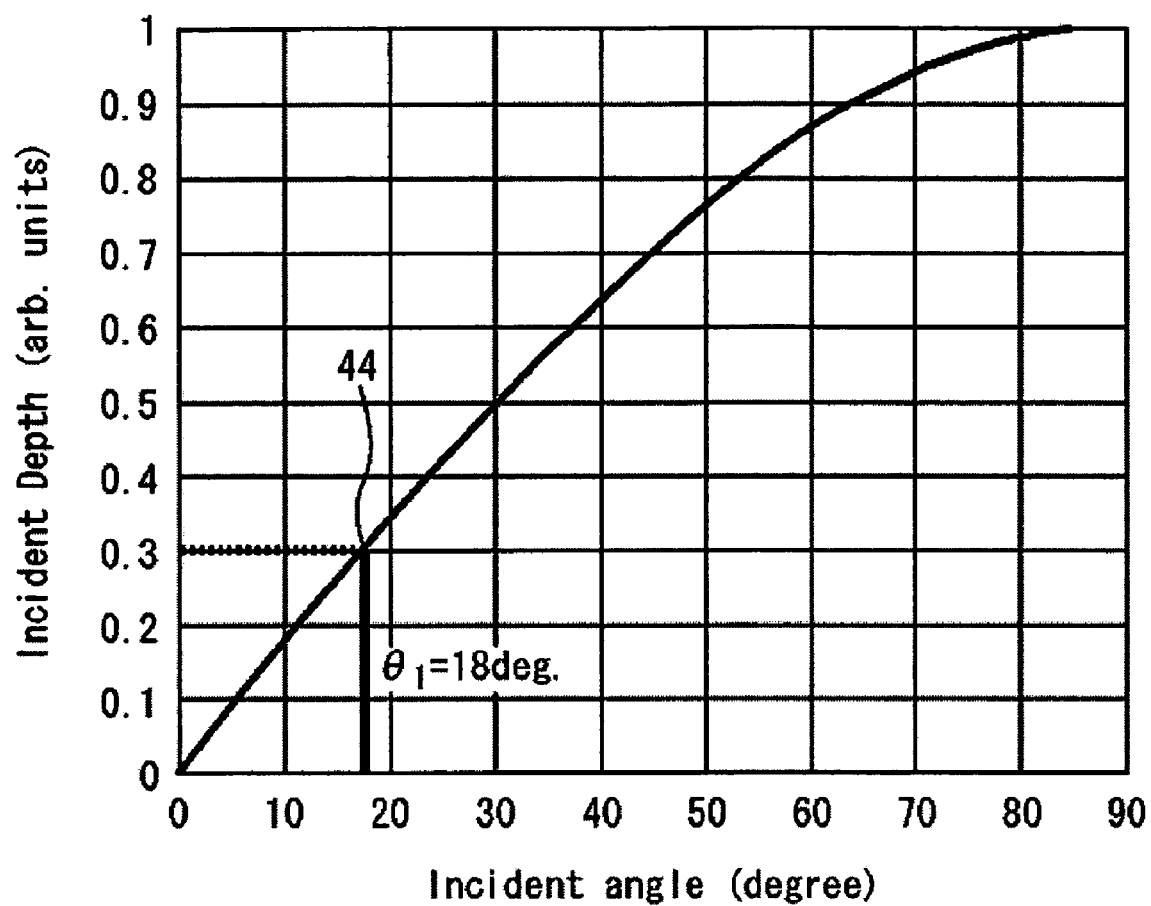
FIG. 3 is a diagram showing the relationship between the incident depth and the incident angle of incident ions according to an embodiment of the invention.
Figure 6:
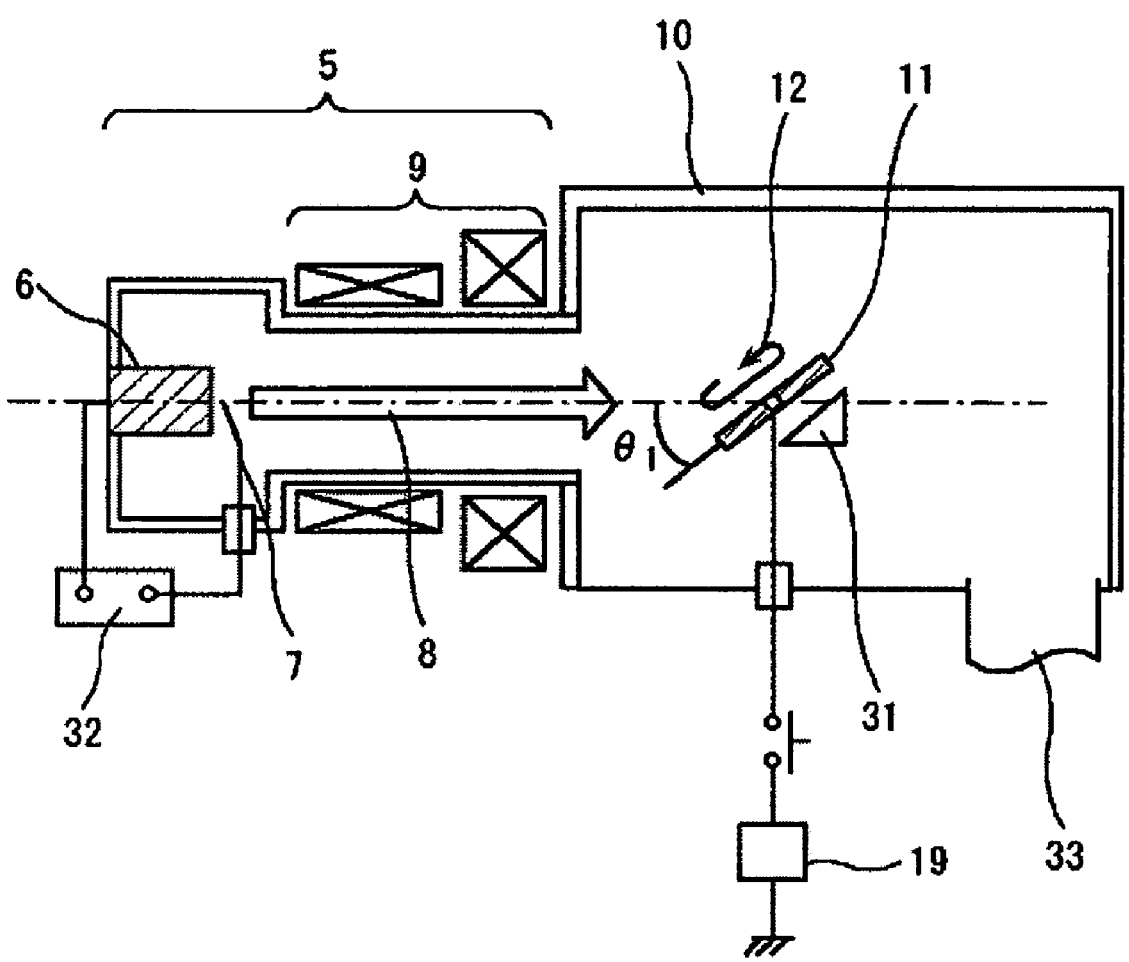
FIG. 6 is a constitutional view of a thin film magnetic head manufacturing device having an ion flow incident angle control by a to-be-processed substrate inclining mechanism as one of features of the invention.

In accordance with the process flow of the present invention shown in FIGS. 1(a), 1(b) and 1(c), an air bearing surface protective film of a magnetic head is manufactured by a thin film magnetic head manufacturing apparatus in FIG. 6. In a first embodiment of this magnetic head, a low mass density amorphous carbon 13 is formed directly in the manufacturing apparatus of FIG. 6 without using a thin silicon film on an alumina titanium carbide substrate 2 in which a read/write element 1 is formed. As an ion source, an arc plasma source 5 is used. Specifically, when an anode 7 is brought into contact with a graphite cathode 6 connected with an arc power source 32 in the arc plasma source 5, a great amount of thermoelectrons are emitted and electric fields are generated near the cathode 6. Carbon ions 8 jetting out from the cathode 6 by the arc discharge are accelerated to about 50 to 100 eV and a portion thereof passes through a cylindrical magnetic field duct 9 of about 8 inch diameter and enters a film deposition chamber 10. Generated carbon ions 8 have an energy of 100 eV at the maximum and low mass density amorphous carbon 13 at 10 Å is formed in a substrate 11 to be processed under rotation of 20 rpm with an incident angle $\theta_1$ to the substrate of about 18° in FIG. 6. In this case, carbon ions 8 at about 100 eV enter the read/write element and since the incident angle $\theta_1$ is controlled to about 18° (low incident angle), they intrude to the alumina titanium carbide substrate 2 by about 2 Å (dead layer), and intrude to the NiFe thin film (mass density: 8.3 g·cm$^{-3}$) by about 3 Å (dead layer) from point 44 in FIG. 3 and from point 30 in FIG. 4(b). Reference numeral 44 in FIG. 3 denotes an incident depth at $\theta_2$=18° assuming the incident depth to the target thin film at an incident ion incidence angle: $\theta_1$=90° being as 1 (0.3 times). Reference numeral 30 in FIG. 4(b) denotes a depth (3 Å) when carbon ion at 20 eV intrudes at $\theta_1$=90° to the NiFe film at a mass density of 8.3 g·cm$^{-3}$ at eV introduced to an NiFe film with mass density of 8.3 g·cm$^{-3}$ at $\theta_1$=90°. Accordingly, a dead layer 14 in FIG. 1 of 3 Å not substantially contributable to the magnetic characteristics is generated while being excluded as much as possible. Then, while keeping the rotation 12 in FIG. 6 of the substrate, the incident angle of the carbon ion 8 to the substrate, 11 to be processed is changed from about 18° (low incident angle) to about 90° (high incident angle) by a substrate inclining mechanism 31 to form a tetrahedral amorphous carbon 4 to 10 Å. In this case, the incident depth region 20 in FIG. 1 of the carbon ion to the previously deposited low mass density amorphous carbon 13 is about 6 Å at the maximum to form a stress relaxation layer (refer to point 45 shown in FIG. 5(b)). Reference numeral 45 denotes the depth (6.0 Å) of the carbon ions at 100 eV in the carbon film with mass density of 2 g·cm$^{-3}$ at $\theta_1$=90°.

As described above, the first embodiment has a multi-layered structure of a thin carbon film as an air bearing surface protective film, and it is defined that the lowermost layer in contact with the air bearing surface protective film on the side of the magnetic device is constituted with a reduced mass density compared with thin carbon film constituting other adjacent layers.

That is, while comparative example 1 to be described later required a stress relaxation layer with about 15 Å of a thin silicon film, the object can be attained with a thickness of about 6 Å in the low mass density amorphous carbon 13. As described above, the film thickness 17 not substantially contributing to the magnetic characteristic is about 23 Å in total of 3 Å for the dead layer 14 being excluded as much as possible and the total thickness of 20 Å for the protection film in FIG. 1. Further, while the incident angle $\theta_1$ to the substrate to be processed is about 18° in the first embodiment, it will be apparent that the optimal incident angle is selected depending on the incident carbon ion energy and the thickness of the thin film as the target of the carbon ion.

Using magnetic heads formed by using the methods shown in the first embodiment and in a comparative example prepared by the existent method to be described later, read/write characteristics are evaluated for the same magnetic recording medium. Table 1 shows the result of test for read/write characteristics of magnetic head. The number of samples is 40 respectively. Table 1 shows their average values.

TABLE 1

| Sample | Constitution and thickness (Å) of protection film | Dead layer thickness (Å) | Magnetically ineffective thickness (Å) | Read characteristics (resolution %) | Over Write characteristics (dB) |
|---|---|---|---|---|---|
| Example 1 | Uppermost layer: 10 Å tetrahedral amorphous carbon film Lowermost layer: 10 Å low mass density amorphous carbon film Total film thickness: 20 Å | 3 | 23 | 64.00 | −25.35 |
| Comp. Example 1 | Uppermost layer: 20 Å tetrahedral amorphous carbon film Lowermost layer: 15 Å low mass density amorphous carbon film Total film thickness: 35 Å | 0 | 35 | 62.53 | −25.02 |

$\theta_1$=90°; 40 denotes a depth (9 Å) when carbon ion at 100 eV intrudes at $\theta_1$=90° to an NiFe film with mass density of 8.3 g·cm$^{-3}$; 41 denotes a depth (6.5 Å) when the carbon ion at 65

According to the results, compared with the sample formed in comparative example 1, the magnetic head formed by using the first embodiment provides a result that the resolution of the read characteristics is improved by about 1.5 point. Further, also for over write characteristics, improvement by about 0.4 dB is observed. This result agrees with the effect by the reduction of the space loss that does not contribute to the magnetic characteristics including the dead layer and the protective film thickness. That is, while the space loss is 35 Å in comparative example 1, the space loss is 23 Å in the first embodiment and it is concluded that the difference of about 10 Å provides the difference in the magnetic characteristics.

Table 2 shows the corrosion resistance of the magnetic head having the air bearing surface protective film according to the invention. Table 2 shows the results of the corrosion resistance test for the magnetic head prepared by the embodiment (example 1) of the invention and for comparative magnetic heads prepared for demonstrating the effect of the invention (comparative examples 1, 2, and 3).

TABLE 2

| Sample | Constitution and thickness (Å) of protection film | Dead layer thickness (Å) | Acid immersion test error (%) | High temperature high humidity test error (%) |
|---|---|---|---|---|
| Example 1 | Uppermost layer: 10 Å tetrahedral amorphous carbon film Lowermost layer: 10 Å low mass density amorphous carbon film Total film thickness: 20 Å | 3 | 2 | 0 |
| Comp. Example 1 | Uppermost layer: 20 Å tetrahedral amorphous carbon film Lowermost layer: 15 Å silicon film Total film thickness: 35 Å | 0 | 2 | 0 |
| Comp. Example 2 | Uppermost layer: 10 Å tetrahedral amorphous carbon film Lowermost layer: 10 Å hydrogen containing low mass density amorphous carbon film Total film thickness: 20 Å | 3 | 20 | 5 |
| Comp. Example 3 | Uppermost and Lowermost layers: 20 Å tetrahedral amorphous carbon film Total film thickness: 20 Å | 9 | 30 | 8 |

Specimens include: a sample having a protective film of 35 Å formed in comparative example 1; a sample having a protective film of 20 Å formed in the first embodiment; a sample having a protective film of 20 Å obtained by forming a hydrocarbon film as a low mass density amorphous carbon as the lowermost layer by 10 Å and then forming tetrahedral-amorphous carbon by 10 Å as comparative example 2; and a sample obtained by forming only tetrahedral-amorphous carbon 4 by 20 Å using neither the thin silicon film nor low mass density amorphous carbon as comparative example 3. As the corrosion resistance test, an acid immersion test and high temperature high humidity test were conducted. The acid immersion test is a test of immersing a magnetic head in an acidic liquid and examining the corrosion resistance by observing the change of resistance for the magnetic head device portion. The high temperature high humidity test is a test of keeping a magnetic head in a chamber at an air temperature of 85° C. under humidity of 85% for 100 hours, and examining the corrosion resistance based on the ratio of the devices in which the device resistance changed after the test. From the results of the corrosion test, it was found that the magnetic head of the first embodiment having the protective film of 20 Å according to the invention had the same extent of corrosion resistance equivalent with that of the sample having the protective film at 35 Å formed in comparative example 1. On the other hand, it can be seen that the corrosion resistance is apparently degraded in a case of using the hydrocarbon film for the low mass density amorphous carbon for the lowermost layer as comparative example 2. While this is to be described specifically in example 5, it is considered that the hydrogen atoms contained in the film deteriorate the corrosion resistance. This demonstrates that the lowermost layer of the bearing surface protective film has to be substantially formed only with the carbon atoms in order to effectively utilize the present invention. Further, it can be seen that the corrosion resistance is greatly degraded in the sample of comparative example 3 in which only the tetrahedral-amorphous carbon 4 is formed to 20 Å directly. This is supposed to be a problem in view of the adhesion of the thin film by tetrahedral-amorphous carbon 4 with higher internal compressive stress.

FIG. 13 shows results of a scratch test for the bearing surface protective film formed by using the first embodiment and comparative example 1. In this scratch test, the load was increased while sweeping the bearing surface protective film on an alumina titanium carbide substrate 2 by a micro diamond chip, in which the load is expressed on the abscissa and the friction is expressed on the ordinate. A scratch profile 54 of a standard sample using a thin silicon film corresponding to comparative example 1 and a scratch profile 55 of a sample not using the thin silicon film corresponding to the first embodiment are shown. Further, an arrow 56 in the graph shows the initiation point for scratch peeling of the standard magnetic head using the thin silicon film corresponding to comparative example 1. According to the results, the air bearing surface protective film formed by the invention shows the peeling initiation point (turning point) is not observed.

As described above, compared with the electric characteristics and the corrosion resistant characteristics obtained by existent air bearing surface protective film with a thickness of 35 Å in comparative example 1, the electric characteristics can be improved and equivalent or superior corrosion resistance can be ensured by using the air bearing surface protective film at 20 Å obtained by the method of forming the thin carbon film in Example 1. Further, it is confirmed that the wear resistance is improved further irrespective of reduction in film thickness to as thin as 20 Å.

SECOND EMBODIMENT

Figure 2:
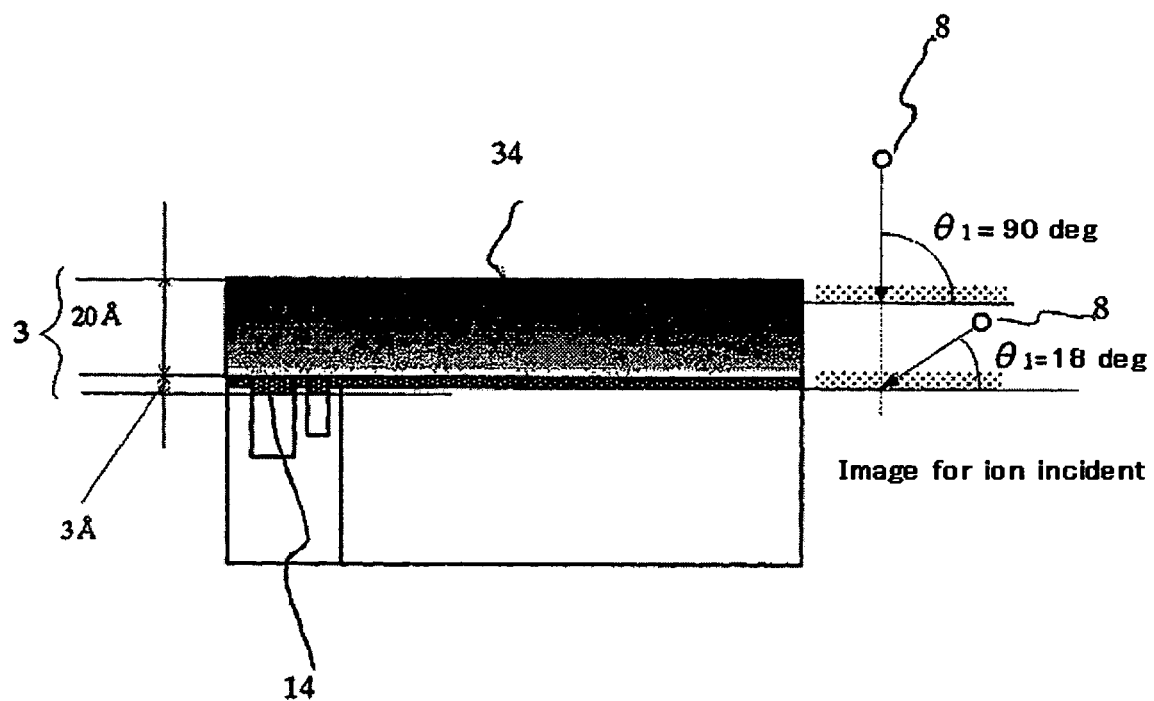
FIG. 2 is a schematic cross-sectional view of a magnetic head slider having an air bearing surface protective film of 20 Å thick in which the mass density of the air bearing surface carbon protective film increases toward the uppermost surface of the air bearing surface protective film according to an embodiment of the invention.

In the manufacturing method of the first embodiment, the thin carbon film is formed by being divided into two layers by interrupting vapor deposition during change of the incident angle of the carbon ions 8 at about 100 eV from about 18° to about 90° due to control of the vapor deposition rate. However, the vapor deposition can also be conducted continuously during change of the incident angle with no problem by previously measuring the vapor deposition rate. FIG. 2 shows a schematic cross sectional view of a magnetic head slider formed by continuously conducting vapor deposition also during the change of the incident angle. In this schematic view, the mass density of the thin carbon film 34 is depicted by the tint in which a region depicted more densely shows higher mass density. That is, in the initial stage of the vapor deposition, a low mass density thin carbon film is formed on the surface in contact with the magnetic device at about 100 eV with the incident angle of the carbon ions 8 of about 18° (low incident angle). Then, the incident angle of the carbon ions 8 is increased gradually along with increase of the deposited film thickness and vapor deposition is completed at about 100 eV at the incident angle of the carbon ions 8 of about 90° (high incident angle) upon formation of the protective film for the uppermost surface, so that the mass density for the bearing surface protective film increases toward the uppermost surface of the bearing surface protective film.

This second embodiment comprises a carbon thin film 34 as the air bearing surface protective film in which the mass density of the thin carbon film 34 increases toward the uppermost surface of the air bearing surface protective film. The film thickness 3 not substantially contributing to the magnetic characteristics is 23 Å in total for 3 Å with the dead layer 14 being excluded as much as possible and the total protective film thickness of 20 Å. Further, while the incident angle $\theta_1$ for the substrate was about 18° in this embodiment, it will be apparent that the optimal incident angle should be selected depending on the incident carbon energy and the thickness of the thin film as the target of the incident carbon ions.

EXAMPLE 1

Figure 7:
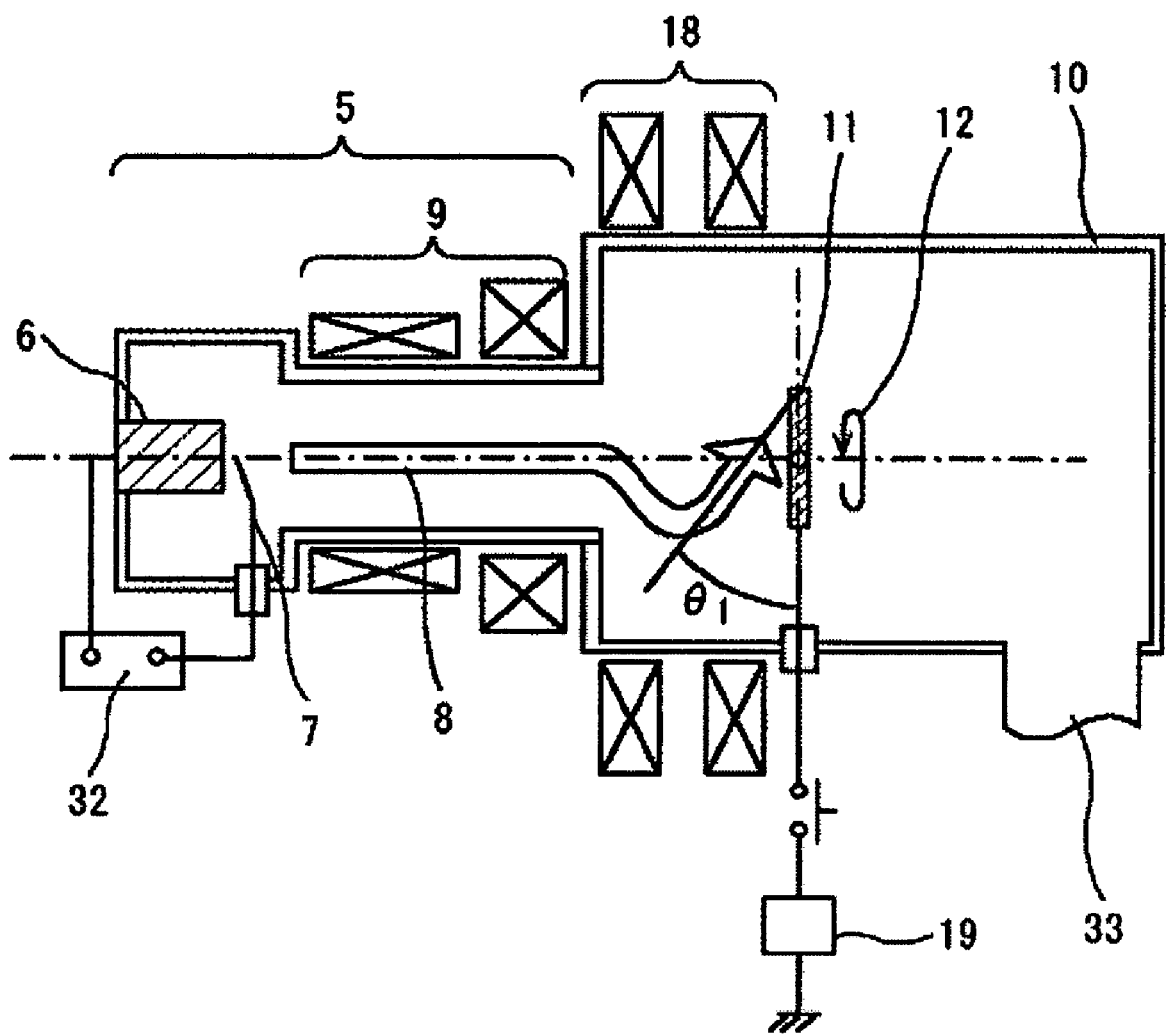
FIG. 7 is a constitutional view of a thin film magnetic head manufacturing device having an incident angle control for an ion flow by an electromagnet.

To obtain the same effect as that by the method of forming the thin carbon film of the first and second embodiments, a thin film magnetic head manufacturing apparatus shown in FIG. 7 is also effective. This example 1 provides a thin film magnetic head manufacturing apparatus in which carbon ions 8 are vapor deposited while controlling the incident angle $\theta_1$ to the substrate 11 to be processed by an ion flow control mechanism comprising an electromagnet 18 for forming a thin carbon film. A bias voltage application mechanism 19 is connected with the substrate 1 to be processed. In Example 1, the electromagnet 18 is excited at an optional frequency to generate the magnetic fields at a magnetic flux density of 500 to 1000 gauss thereby controlling the incident direction of the carbon ions 8 and enabling radiation to the substrate 11. Instead of example 1, a capacitive coupled electrode may be disposed at a junction portion between the film deposition chamber 10 and the arc plasma source 5 as an ion source for controlling the ion flow, to which voltage is applied to generate an electric field at about 800 V/m by which the ion incident direction can be bent to control the incident angle $\theta_1$ of the carbon ions 8 to the substrate 11 to be processed.

EXAMPLE 2

Figure 8:
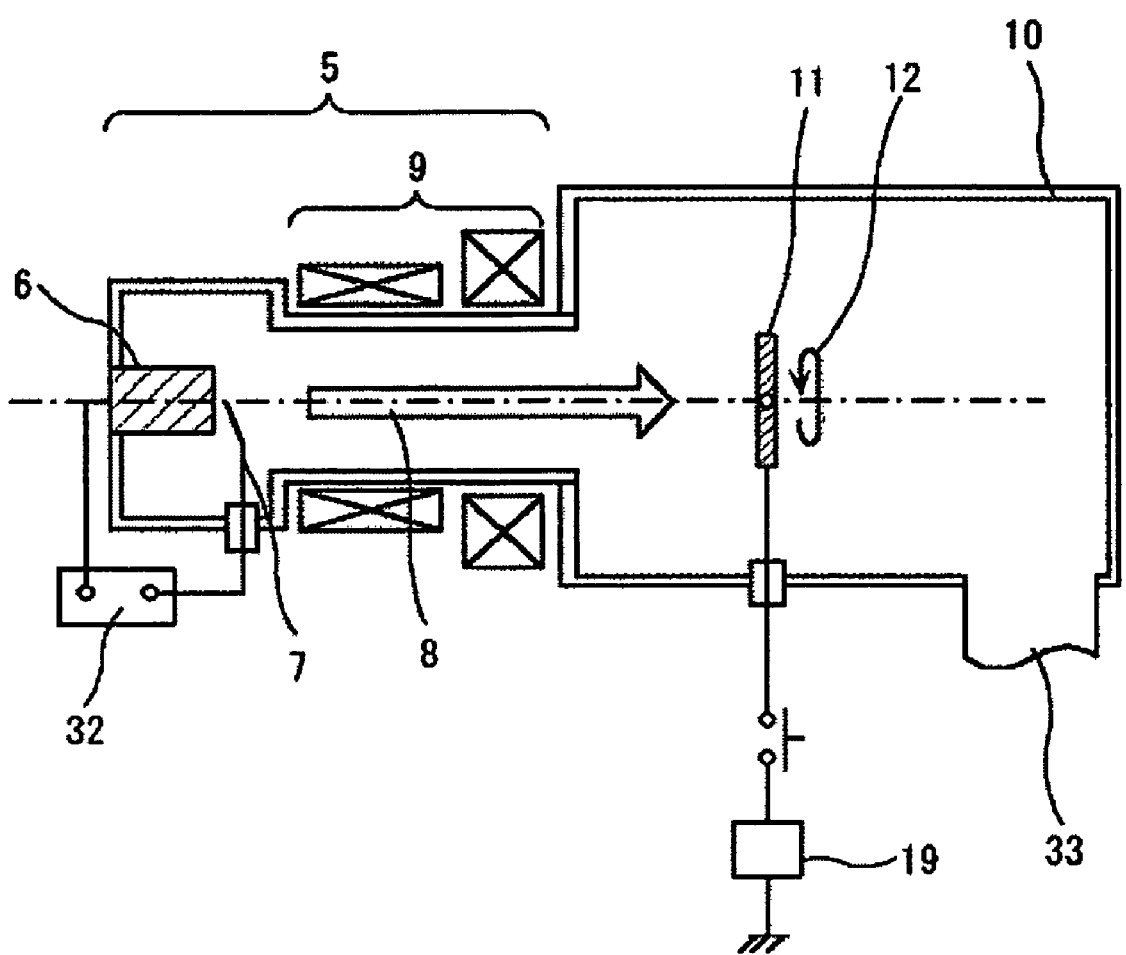
FIG. 8 is a constitutional view of a thin film magnetic head manufacturing apparatus capable of energy control for an ion flow by applying bias to a substrate to be processed for a predetermined time from the start of deposition.

To obtain the same effect as that of the method of forming the thin carbon film of the first and second embodiments, a thin film magnetic head manufacturing apparatus shown in FIG. 8 is also effective. Example 2 provides a thin film magnetic head manufacturing apparatus in which a bias voltage 19 is applied to an electrode for holding a substrate 11 to be processed for a predetermined period of time from the start of vapor deposition upon conducting vapor deposition by applying carbon ions 8 at a predetermined incident angle on the substrate 11 to be processed for forming a thin carbon film. Specifically, energy of one carbon ion extracted from an ion source is 100 eV at the maximum and a positive bias voltage 19 is applied to the substrate 11 to be processed to generate a deceleration voltage for decreasing the energy. The positive bias voltage 19 is applied for a predetermined time corresponding to the film thickness of about 10 Å. In this case, when the application voltage is, for example, at +80 V, the energy per one carbon ion can be decreased to about 20 eV at maximum, and the incident depth of the carbon ions to the thin metal film constituting the magnetic head device can be decreased (for example, incident depth is about 3 Å to a thin NiFe film with mass density of 8.3 g•cm$^{-3}$ from the point 30 in FIG. 4(b)).

The vapor deposition at the low energy ion is insufficient in view of the energy for forming the tetrahedral-structure and the film density of the obtained thin carbon film is about 2.0 g•cm$^{-3}$. After depositing the low mass density amorphous carbon 13 by about 10 Å, tetrahedral-amorphous carbon 4 was stacked corresponding to 10 Å and it was confirmed that the thin carbon film could be formed finally by 20 Å. That is, the film thickness not substantially contributing to the magnetic characteristics is 23 Å as the total for 3 Å of the dead layer 3 and 20 Å for the total thickness of the protective film.

EXAMPLE 3

Figure 9:
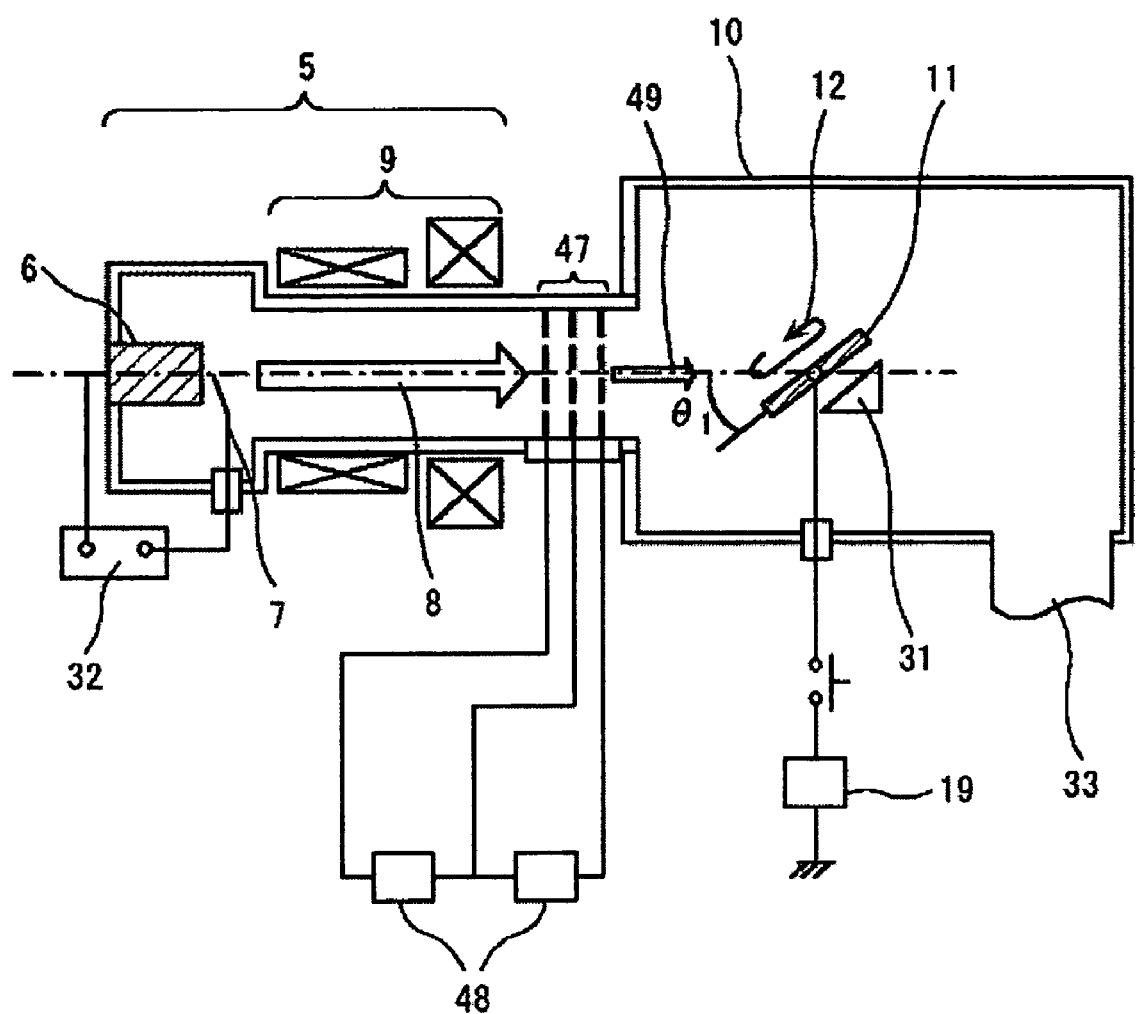
FIG. 9 is a constitutional view of a thin film magnetic head manufacturing apparatus capable of energy control for an ion flow by a plurality of grid electrode and having a mechanism for inclining a substrate to be processed and a mechanism of applying bias to a substrate to be processed.
Figure 1:
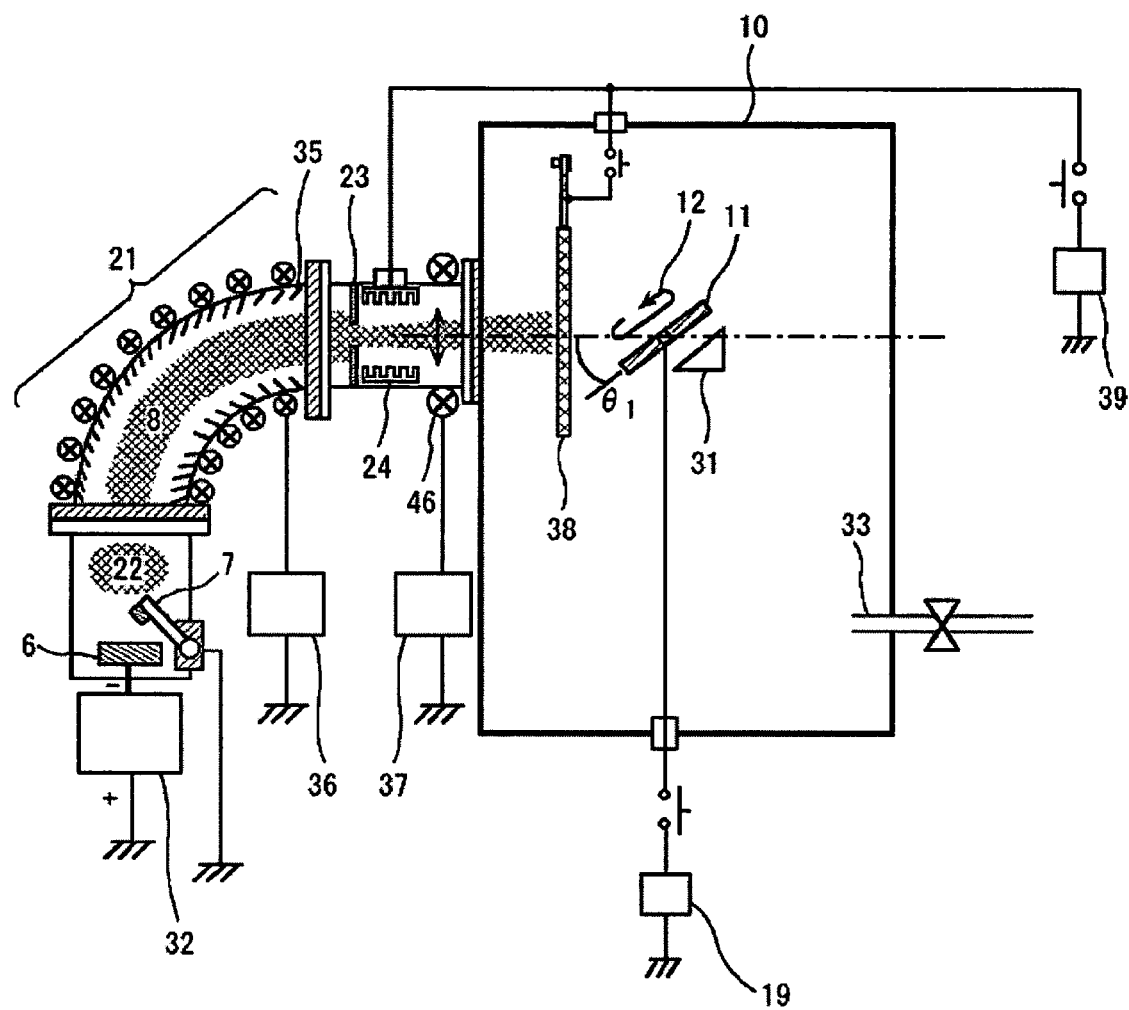
Figure 1:
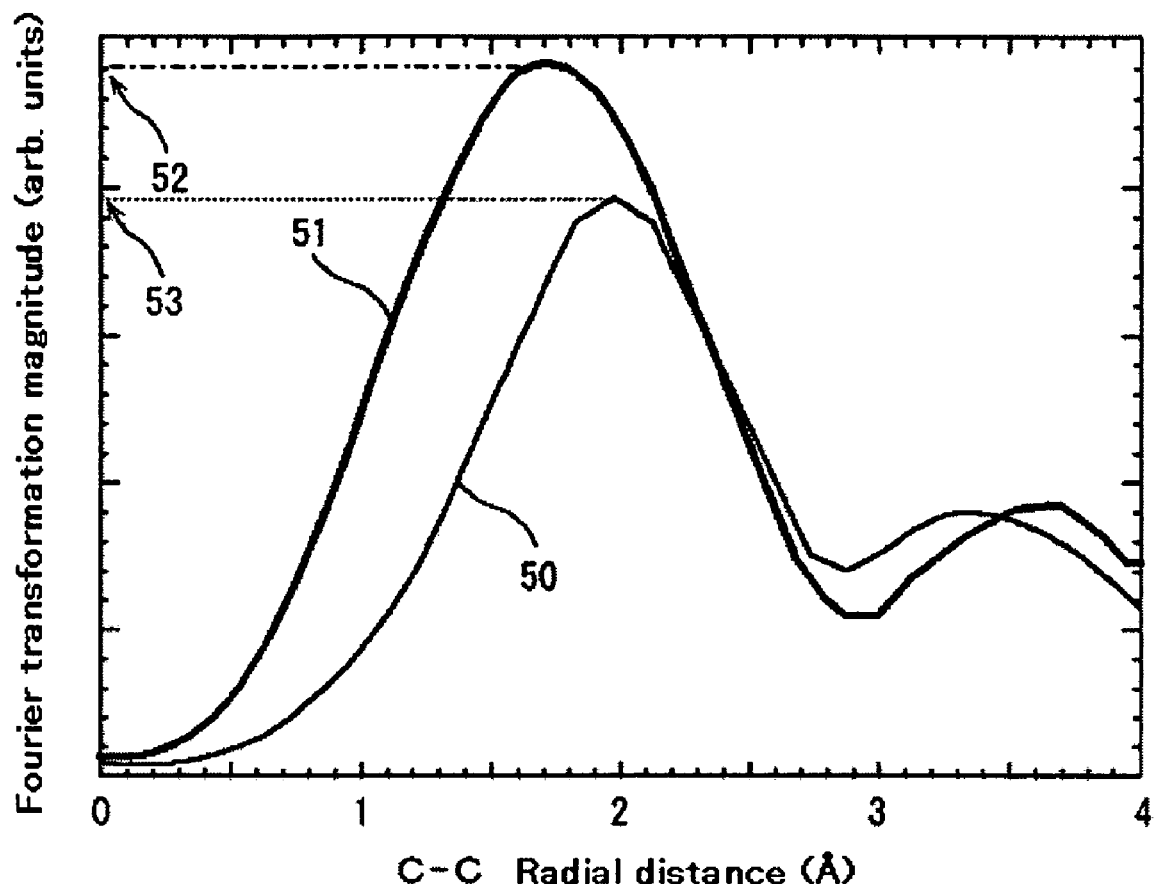
Figure 1:
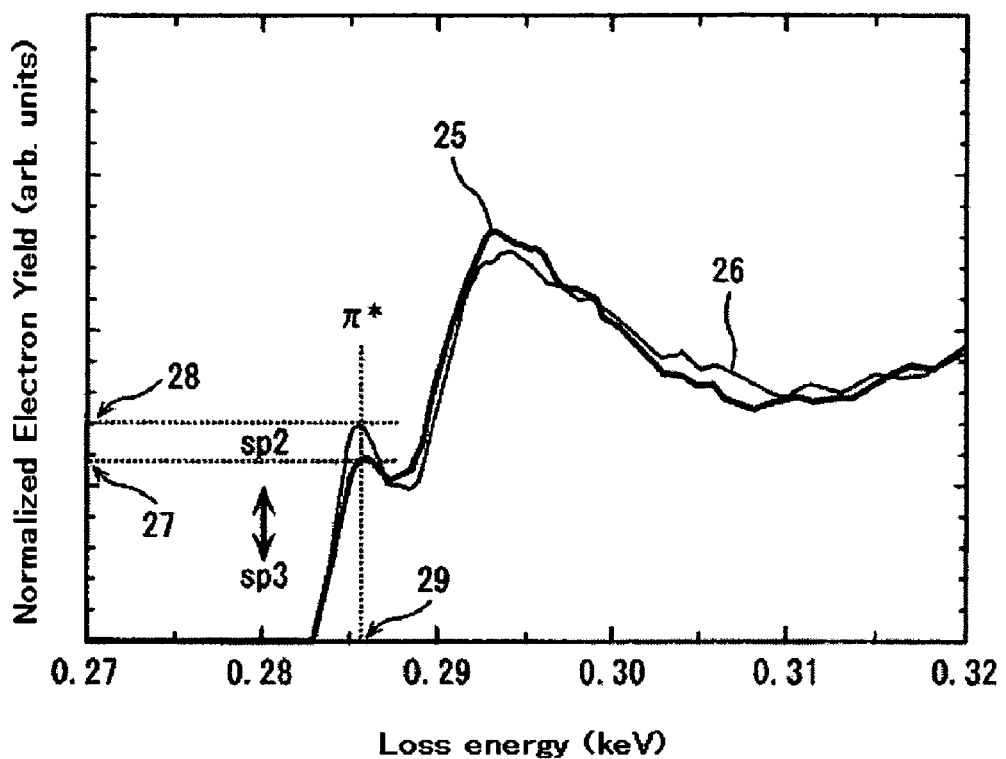
Figure 1:
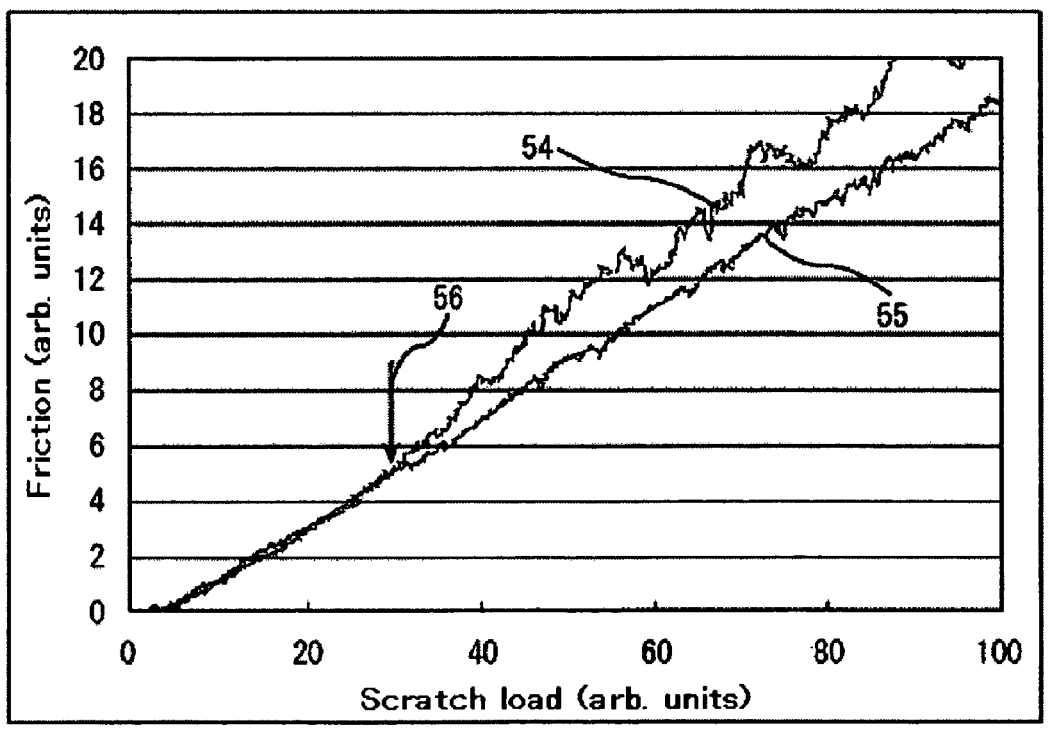

In example 3, a grid electrode 47 connected with a grid power source 48 is disposed between an arc plasma source 5 and a film deposition chamber 10 as shown in FIG. 9, to control the energy of the ion flow of the carbon ions 8 and, for example, carbon ions 49 at a low energy can be directed to the substrate 11 to be processed. Various effects can be expected by the combination of a substrate inclining mechanism 31 and a substrate bias application mechanism 19 as shown in FIG. 9. However, this involves a problem in that the grid electrode 47 cannot increase the amount of ion in-flow unless the ion energy is increased due to the space charge limitation, or carbon particles are deposited on the grid surface to form dust, and a countermeasure therefor is necessary.

EXAMPLE 4

FIG. 10 is a detailed constitutional diagram of a thin film magnetic head manufacturing apparatus in which an arc plasma source comprises an anode 7, a cathode 6 and a bend duct 21, and a film deposition chamber to be introduced with the ion flow comprises a to-be-process substrate inclining mechanism 31, and a to-be-processed substrate bias application mechanism 19, which are adapted for the control of ion flow incident angle and the control for the ion flow energy. The arc discharge is generated in a high vacuum atmosphere by the application of a voltage between the anode 7 and the cathode 6 by an arc power source 32. The cathode target 6 is composed of carbon (graphite) and put to an extremely high temperature as in arc welding, to generate carbon plasmas from the target surface. Carbon plasma 22 means herein a state in which carbon ions 8 mainly comprising C$^+$ and electrons are generated in vacuum at a gas pressure of 10$^{-4}$ Pa or lower. Arc current is caused to flow to the carbon target as the cathode 6 to generate arc discharge at an arc voltage Eo of about 25 V. The carbon ions 8 and the electrons are efficiently introduced to the film deposition chamber 10 by using a transportation magnetic field bend duct 21 and directed to the substrate 11 to be processed so as to form a uniform film thickness distribution by using an ion flow scanning electromagnet (scanning coil) 46 connected with a scanning coil power source 37 to form thin films. Since a solid target is used, a carbon film scarcely containing hydrogen is obtained as the thin film to be formed. Further, in this structure, droplets formed by arc discharge can be decreased greatly by the bend duct 21, a baffle filter 23 and an electric field filter 24. The bend duct coils are connected with a duct coil power source 36. A removable duct bellows 35 is disposed inside the bend duct 21. The electric field filter 24 and the shutter 38 are connected to an electric field/shutter bias power source 39. In this case, tetrahedral-amorphous carbon or low mass density amorphous carbon, etc. can be obtained by controlling the incident angle $\theta_1$ of the carbon ions on the substrate to be processed and the control of the carbon ions.

EXAMPLE 5

In the manufacturing method in the first and second embodiments and examples 1 to 4, the low mass density amorphous carbon 13 at the lowermost layer is also formed by using control for the ion incident angle and the ion energy basically of the vapor deposition apparatus having the ion source capable of forming tetrahedral-amorphous carbon 4 with mass density of about 2.5 to 3.4 g·cm$^{-3}$ that constitutes a bearing surface protective film. In example 5, a description is to be made of the method of forming a low mass density amorphous carbon 13 as the lowermost layer with mass density of about 1.5 to 2.4 g·cm$^{-3}$ by using another ion source and sputtering source. It is based on that each film deposition chamber is brought into connection at least under vacuum.

In example 5, the low mass density amorphous carbon 13 is formed to have a thickness of 10 Å as the lowermost film by a physical vapor deposition (PVD) method. The average energy of sputtered particles in the PVD method is at about 5 eV, and no dense tetrahedral structure is grown in the low energy vapor deposition particles at a low pressure and the obtained film is a low mass density amorphous carbon 13 with the mass density of about 1.5 to 2.4 g·cm$^{-3}$. Then, the tetrahedral-amorphous carbon 4 is formed as a carbon film of 10 Å with a mass density of about 2.5 to 3.4 g·cm$^{-3}$ by using a vapor deposition apparatus having the arc plasma source 5. As described above, example 5 can provide a magnetic head in which the thin carbon film comprises a multi-layered structure with the mass density of the lowermost layer of the air bearing surface protective film on the magnetic device side in contact with the magnetic device being lowered compared with the thin carbon film constituting other adjacent layers. In example 5, the average energy of sputtered particles upon forming the low mass density amorphous carbon 13 is 5 eV and the generated dead layer is of about 1 Å.

However, it is to be noted particularly in Example 5 that the low mass density amorphous carbon 13 as the lowermost layer should not be formed by a reactive physical vapor deposition (reactive PVD) method or a chemical vapor deposition (CVD) method using a hydrocarbon gas as a reaction gas. Although it is possible to form a thin film with less internal compressive stress and low mass density (polymer carbon) by using the method described above, this is formed as a hydrocarbon film containing about 40 to 50 at % of hydrogen. Since the ratio that dangling bonds formed in the film structure are terminated with hydrogen atoms is increased, the network as the thin film tends to be disconnected. As a result, the corrosion resistance as the magnetic head protective film which is necessary as the primary function is deteriorated. Indeed, when the low mass density amorphous carbon 13 was formed by the CVD method using the hydrocarbon gas, it was found that the film involves a significant problem in view of the corrosion resistance (refer to the first embodiment).

EXAMPLE 6

In the first and second embodiments, when the mass density was confirmed for the thin carbon film formed by using any one of the methods of examples 1 to 5 by using the RBS (Rutherford Backscattering Spectrometry) and the HFS (Hydrogen Forward Scattering analysis) method, the mass density was about 2.5 to 3.4 g·cm$^{-3}$ for the tetrahedral-amorphous carbon 4 in each of the examples. On the other hand, it was confirmed for the portions except the uppermost layer that it was the low mass density amorphous carbon 3 with the mass density of about 1.5 to 2.4 g·cm$^{-3}$ depending on the process conditions. It is probable that the SP$^3$ bonding ratio is decreased in the film and the mass density is decreased in the low mass density amorphous carbon.

Further, in the first and second embodiments, since the arc plasma source in examples 1 to 5 behaves like plasmas in which electrons are emitted together with ions, it is confirmed that substantially the same film quality can be obtained both in the case of grounding the substrate to be processed or putting the substrate at a floating potential. To obtain tetrahedral-amorphous carbon with a higher mass density, when a slightly negative bias is applied to the substrate to be processed for optimizing the ion energy within a range from about 50 to 200 eV, the SP$^3$ bonding ratio in the film can be increased to obtain a thin carbon film of further higher mass density. However, the application of greatly increased negative bias so as to provide the ion energy in excess of 200 eV rather decreases the SP$^3$ bonding ratio in the film to provide a film quality like that of graphite. In addition, the increased ion incident depth is of concern.

The tetrahedral-amorphous carbon constituting the uppermost surface (uppermost portion) of the air bearing surface protective film of the magnetic film manufactured by the methods of the invention described above is a thin carbon film with a required minimum thickness for forming the tetrahedral structure (SP$^3$) (lattice constant) of 3.5 Å or more and with a mass density of about 2.5 to 3.4 g·cm$^{-3}$. On the other hand, the low mass density amorphous carbon 13 constituting the surface (portion) of the air bearing surface protective film in contact with the magnetic device is a carbon film with the mass density of about 1.5 to 2.5 g·cm$^{-3}$ and the SP$^3$ bonding ratio of less than 50%, and it should be 2.5 Å or more for the required minimum thickness at least to form the trigonal structure (SP$^2$). However, since the total film thickness of the bearing surface protective film of the magnetic head applied to the current products of our company is 50 Å, the effect of the invention with an aim of reducing the thickness of the protective film of the magnetic head can be recognized only for the region with the total film thickness of less than 50 Å. Accordingly, to reduce the total film thickness of the tetrahedral-amorphous carbon and the low mass density amorphous carbon to less than 50 Å, the range therefor is defined as about 3.5 Å or more and less than about 47.5 Å for the tetrahedral-amorphous carbon and as about 2.5 Å or more and less than about 46.5 Å for the low mass density amorphous carbon.

EXAMPLE 7

AES-EELFS (extended electron energy loss fine structure using Auger electron spectroscopy) analysis is a method of causing low speed electrons at several 100 eV or lower to enter a target specimen by using an EELS (electron energy loss spectroscopy) detector appended to AES (Auger electron spectroscopy) apparatus and measuring the energy distribution of electrons in inelastic scattering by interactions with the specimen surface layer. In addition, this can analyze the state of electrons in the extreme surface layer of 10 nm or less from the surface and analysis for local structure like AES. In this method, it is possible to measure the inner shell excitation loss spectrum (core loss spectrum) by using the EELS detector, and the state of electron and local structure of the target specimen can be analyzed based on EELFS (extended electron energy loss fine structure) or ELNES (energy loss near edge structure).

Since EELFS may be considered to be equivalent with EXAFS (extended X-ray absorption fine structure), a radial distribution function of aimed atoms can be obtained by applying the EXAFS analyzing technique. The dynamic radical distribution function shows the distribution of the bonding strength between aimed atoms. When an abscissa represents the bonding distance between the aimed atoms, the coordinate represents the distribution and the absolute value thereof as the Fourier transformation magnitude. However, actual measurement provides information in which information about atomic distances overlaps. Considering a thin film constituted with carbon atoms, when diamond with high mass density and graphite with low mass density are compared with each other, for example, in view of the Fourier transformation magnitude up to 4 Å of the carbon atomic distance, the maximum Fourier transformation magnitude obtained from diamond is outstandingly higher than the maximum Fourier transformation magnitude from graphite. This is because diamond is formed of the tetrahedral structure ($SP^3$) and with a number of coordinations within a short carbon atomic distance. On the other hand, graphite shows a distribution not having large peaks relative to the carbon atomic distance. This is because the number of coordinations is in average relative to the carbon atomic distance. Accordingly, for the dynamic radical distribution function, in view of the mass density of the thin carbon film, those of higher mass density correspond to higher maximum Fourier transformation magnitude. When the bearing surface protective film of a magnetic head is measured, to perform depth analysis for a fine region, measurement was conducted on the slider portion of the magnetic head surface where the air bearing surface protective film was formed, with primary electron beam energy, at a current of 0.9 keV and about 40 nA at an angle of 45° relative to the normal direction of the specimen, with a beam diameter of about 20 µm. Further, sputtering was conducted by using primary ions $Ar^+$ in the direction of the depth and analysis was conducted for arbitrary optional depth.

FIG. 11 shows the results of determining the dynamic radical distribution function of carbon atoms in the direction of the depth for the air bearing surface protective film of the magnetic head formed in the first embodiment. The profile 51 shows a dynamic radical distribution function obtained from the uppermost surface after removal of the contamination on the side of the magnetic head bearing surface (organic contaminates, etc). A profile 50 shows a dynamic radical distribution function obtained from a surface formed by etching by about 10 Å from the side of the magnetic head air bearing surface. According to this results, it could be confirmed that the maximum Fourier transformation magnitude 52 of the surface layer comprising tetrahedral-amorphous carbon has a value larger than the maximum Fourier transformation magnitude 53 of the lowermost layer comprising the low mass density amorphous carbon. Further, the carbon atomic distance shown by the maximum Fourier transformation magnitude 52 on the side of the surface layer shows a shorter inter-bonding distance than the carbon atomic distance shown by the maximum Fourier transformation magnitude 53 on the side of the lowermost layer. Each of the measuring results means that the mass density is higher in the carbon film on the side of the uppermost surface than on the side of the lowermost layer of the bearing surface protective film.

Also for ELNES (Electron Energy Loss Near Edge Structure) spectrum, the difference in the direction of the depth can be confirmed from FIG. 12. A ELNES profile 25 is obtained from the uppermost surface after removal of the contamination on the side of the magnetic head bearing surface (organic contaminates, etc). A ELNES profile 26 is obtained from the surface formed by etching about 10 Å from the magnetic head air bearing surface. According to the results, for the normalization yield of transition 29 belonging to $\pi^*$ ($1s \rightarrow \pi^*$) attributable to the trigonal structure ($SP^2$) that can be confirmed near 285 eV, the value 27 obtained from the outermost surface excluding the contamination on the side of the air bearing surface is smaller than the value 26 obtained from the surface formed by etching about 10 Å from the magnetic head air bearing surface. That is, the measurements mean that the $SP^2$ ratio in the carbon film on the uppermost surface of the bearing surface protective film on the side of the lowermost layer is small.

In FIG. 12, 25 shows ELNES spectrum obtained from the uppermost surface after removal of the contamination on the side of the magnetic head bearing surface; 26 shows ELNES spectrum obtained from the surface formed by etching about 10 Å from the magnetic head bearing surface; 27 shows normalization yield of transition belonging to $\pi^*$ ($1s \rightarrow \pi^*$) of the surface layer comprising tetrahedral-amorphous carbon; 28 shows normalization yield of a transition belonging to $\pi^*$ ($1s \rightarrow \pi^*$) of the surface formed by etching about 10 Å from the magnetic head bearing surface comprising low mass density amorphous carbon; and 29 shows the value of electron energy loss showing transition belonging to $\pi^*$ ($1s \rightarrow \pi^*$).

COMPARATIVE EXAMPLE 1

FIG. 14 is a schematic cross-sectional view of a magnetic head slider in a case of forming tetrahedral-amorphous carbon by 20 Å on a thin silicon film of 15 Å thick by the conventional technology. FIGS. 15(a) and 15(b) are views showing the relationships between the carbon ion energy and energy loss, and between the carbon ion energy and incident depth to thin silicon film, respectively, upon the carbon ion deposition by vertical incidence on the thin silicon film based on the calculation of nuclear stopping power.

An air bearing surface protective film of a magnetic head is prepared by the thin film magnetic head manufacturing apparatus shown in FIG. 6. However, the incident angle $\theta_1$ of ions on the substrate to be processed in FIG. 6 is being fixed to 90° in the existent method. At first, after formation of a thin silicon film with a thickness of 15 Å by a physical vapor deposition (PVD) method or the like so as to improve the adhesion to an alumina titanium carbide substrate 2 formed with a read/write device 1, tetrahedral-amorphous carbon film with a thickness of 20 Å is formed by using the manufacturing apparatus shown in FIG. 6 using the ion source as the arc plasma source 5. In this case, the film thickness not substantially contributing to the magnetic characteristics is 35 Å for the total thickness of the protective film.

Carbon ions of 100 eV intrude to the thin silicon film with a density of 2.0 g•$cm^{-3}$ by about 15 Å as per the point 43 in FIG. 15(b) to form a mixing layer 15 with the silicon. Since the thickness of the thin silicon film is also set to 15 Å, intrusion to the read/write element can be avoided. In FIG. 15, reference numeral 42 denotes loss energy per unit film thickness (7 eV/Å) when the carbon ions at 100 eV intrude into the silicon film with a mass density of 2 g•$cm^{-3}$ at $\theta_1=90°$, while 43 denotes the incident depth (about 15 Å) when the carbon ions at 100 eV intrude into the silicon film with a mass density of 2 g•$cm^{-3}$.

The present invention can reduce the thickness of an air bearing surface protective film of a magnetic head comprising a read element having a magnetic sensor film of a giant magnetoresistive type (GMR) or tunneling magnetoresistive (TMR) type, or other types and a write element using induction magnetic fields generated by carrying electricity to coils.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head in which an air bearing surface protective film formed on an air bearing surface of a magnetic head slider including a multi-layered structure of stacked thin carbon films, and mass density of a first thin carbon film constituting the lowermost layer of the air bearing surface protective film in contact with the magnetic head slider is made lower compared with mass density of a second thin carbon film constituting the uppermost layer of the protective film;

wherein the multi-layered stacked structure of thin carbon films does not include a silicon film; and wherein the second thin carbon film is not grown from the first thin carbon film.

2. A magnetic head according to claim 1, wherein the mass density of carbon atoms of the second thin carbon film is from about 2.5 to 3.4 g·cm-3 and the mass density of the first carbon film constituting the lowermost surface of the air bearing surface protective film in contact with the magnetic device is from about 1.5 to 2.4 g·cm-3.

3. A magnetic head according to claim 1, wherein the thickness of the second thin carbon film is from about 2.5 to 46.5 Å and the thickness of the first thin carbon film in contact with the magnetic device is from about 3.5 to 47.5 Å.

4. A magnetic head according to claim 1, wherein the atomic distance of carbon atoms constituting the second thin carbon film always has a smaller value than the atomic distance of carbon atoms constituting the first thin carbon film in contact with the magnetic device.

5. A magnetic head according to claim 1, wherein an SP3 bonding ratio of carbon atoms constituting the second thin carbon film always has a value larger than the SP3 bonding ratio of carbon atoms constituting the first thin carbon film in contact with the magnetic device.

6. A magnetic head in which an air bearing surface protective film formed on an air bearing surface of a magnetic head slider including a multi-layered structure of stacked thin carbon films including a first thin carbon film and a second thin carbon film formed over the first thin carbon film, in which mass density of the air bearing surface protective film increases toward an uppermost surface away from the magnetic head slider of the air bearing surface protective film;

wherein the multi-layered stacked structure of thin carbon films does not include a silicon film;

wherein the total film thickness of the multi-layered stacked structure of thin carbon films is 20 Å or less.

7. A magnetic head according to claim 6, wherein the mass density of carbon atoms constituting the second thin carbon film is from about 2.5 to 3.4 g·cm-3 and the mass density of the first in contact with the magnetic device is from about 1.5 to 2.4 g·cm-3.

8. A magnetic head according to claim 6, wherein the thickness of the second thin carbon film is from about 2.5 to 46.5 Å and the thickness of the first thin carbon film in contact with the magnetic device is from about 3.5 to 47.5 Å.

9. A magnetic head according to claim 6, wherein the atomic distance of carbon atoms constituting the second thin carbon film always has a smaller value than the atomic distance of carbon atoms constituting the first thin carbon film in contact with the magnetic device.

10. A magnetic head according to claim 6, wherein an SP3 bonding ratio of carbon atoms constituting the second thin carbon film always has a value larger than the SP3 bonding ratio of carbon atoms constituting the first thin carbon film in contact with the magnetic device.

* * * * *